E. A. SANDERS.
Rolling Colter.
No. 199,937. Patented Feb. 5, 1878.
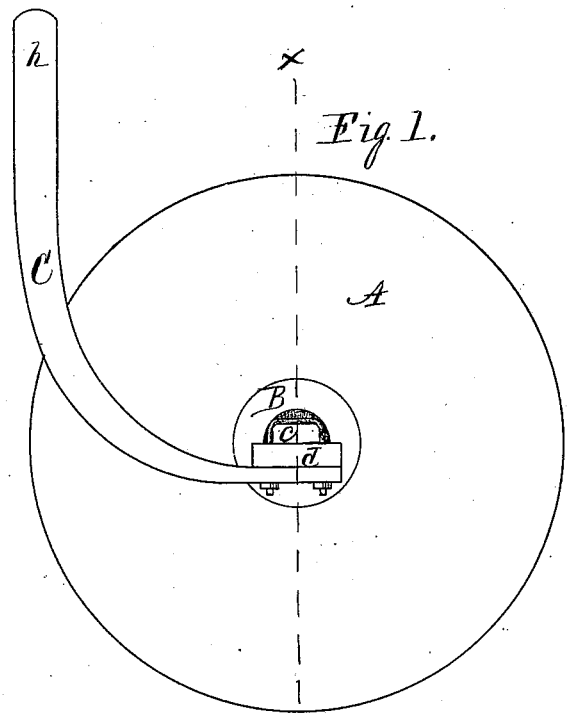
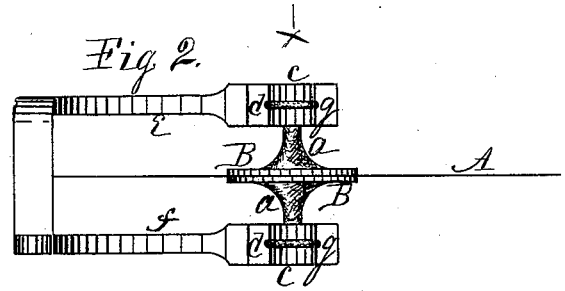
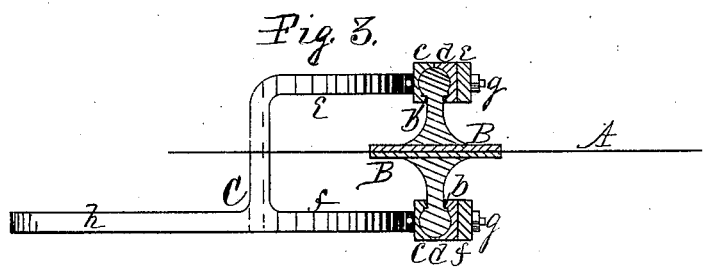
Witnesses.
S. H. Mix
S. Menick
Inventor.
Ebenezer A. Sanders
Per Jacob Behel.
Atty.

UNITED STATES PATENT OFFICE.

EBENEZER A. SANDERS, OF ROCKFORD, ILLINOIS.

IMPROVEMENT IN ROLLING COLTERS.

Specification forming part of Letters Patent No. 199,937, dated February 5, 1878; application filed November 17, 1877.

*To all whom it may concern:*

Be it known that I, EBENEZER A. SANDERS, of the city of Rockford, in the county of Winnebago and State of Illinois, have invented a new and useful Improvement in Rolling Colters, of which the following is a specification:

This invention relates to the rolling colters employed on plows for cutting an opening in the surface in front of the plow, to give relief to the rising furrow.

In rolling colters, as usually constructed, it has been found that dirt and grit work into the bearings of the colter, and soon cut out the journals or bearings, and render the colter unfit for use, or necessitate expensive repairs; and it has been found that the application of oil causes the dirt to adhere, and tends to increase the cutting of the parts.

To obviate these difficulties and otherwise improve the rolling colter is the object of this invention; and it consists in the construction of the journals and the bearings in which they revolve to prevent cramping in the bearings, to exclude dirt and grit, and to retain oil or other lubricant to lessen the wear of the parts.

It is of such construction that the bearings are made reversible, and capable of use on either the upper or lower side of the yoke ends.

In the drawings, Figure 1 is a side elevation of a rolling colter embodying my invention, of which Fig. 2 is a plan view, and Fig. 3 is a section on dotted line $x\ x$.

In the several figures, A represents a rolling colter of the usual form, made from plate material, substantially the same as colters now in use. B are disks constructed with arms $a$ projecting outward from their centers, having their outer ends, at $b$, made in spherical or globular form. These disks are placed on the colter centrally, one on each side and opposite each other, and are secured in place thereto by sufficient rivets or other equivalent means.

The spherical outer ends $b$ of arms $a$ form the journals on which the colter revolves. These spherical journals are fitted to revolve in spherical bearings made in two parts, caps $c$ and bed-plates $d$. Of these the caps $c$ are shorter than the bed-plates $d$, and the bed-plates $d$ are bored at the ends of the caps $c$, to receive the depending arms of the screw-staples $g$, which embrace the cap $c$.

The bed-plates are fitted to the lower rear ends of the arms $e$ and $f$ of the yoke C, which are bored to correspond with the holes in the ends of the bed-plates $d$, and receive the ends of the screw-staples $g$, which project beyond the lower face of the bed-plates.

The ends of the screw-staples $g$ are provided with screw-nuts, by means of which the parts, as described, are held in place in such a manner as to permit the colter to revolve freely in the yoke C on its spherical bearings.

The spherical journals, at their junction with the arms $a$, are formed with a square shoulder, which is produced by reducing the necking of the arms, and are designed to assist in preventing dirt or grit from entering the bearings. That portion of bearings inside of the square shoulders is beveled outward in funnel form, designed to assist in excluding dirt and grit from the journals.

The bearings, consisting of caps $c$ and bed-plates $d$, are made interchangeable and capable of use on the upper or under side of yoke ends.

The yoke C consists of the two curved arms $e$ and $f$, provided with an upward-projecting arm, $h$, which, in connection with suitable clamping devices, furnish the means by which to secure the colter in position to the plow-beam.

If desired, the cap $c$ or bed-plate $d$ may be provided with holes to admit oils to the journals.

I design to produce the disks with central arms and spherical journals, also the bearings, by casting the parts of any suitable material, in the usual manner of producing such work, but do not wish to confine myself to this particular method, as it is evident that these parts may be produced by other methods, such as forging, turning, &c.

I claim as my invention—

1. The combination, with the arms of the yoke C, having spherical journal-bearings secured thereto, of the disks B, each having the shaft $a$ and spherical bearing formed solid therewith, substantially as set forth.

2. The combination, with the arms of the yoke C and disks B, the latter having shafts $a$ and spherical journals $b$ formed solid therewith, of the two-part bearings $c\ d$ and screw-staples $g$, for securing the bearings in place, substantially as set forth.

EBENEZER A. SANDERS.

Witnesses:
 A. O. BEHEL,
 JAMES FERGUSON.